US010343143B2

(12) United States Patent
Kuhn et al.

(10) Patent No.: US 10,343,143 B2
(45) Date of Patent: Jul. 9, 2019

(54) METAL CHELATING COMPOSITES, METHODS OF USING COMPOSITES, AND METHODS OF MAKING COMPOSITES

(71) Applicants: John Norbert Kuhn, Tampa, FL (US); Henry Lee Woodcock, Tampa, FL (US); Mohamed A. Barakat, Jeddah (SA); Mansour A. Alghamdi, Jeddah (SA); Abdulrahman Alkhalaf, Jeddah (SA)

(72) Inventors: John Norbert Kuhn, Tampa, FL (US); Henry Lee Woodcock, Tampa, FL (US); Mohamed A. Barakat, Jeddah (SA); Mansour A. Alghamdi, Jeddah (SA); Abdulrahman Alkhalaf, Jeddah (SA)

(73) Assignees: University of South Florida, Tampa, FL (US); King Abdulaziz University, Jeddah (SA)

( * ) Notice: Subject to any disclaimer, the term of this patent is extended or adjusted under 35 U.S.C. 154(b) by 0 days.

(21) Appl. No.: 15/783,117

(22) Filed: Oct. 13, 2017

(65) Prior Publication Data
US 2018/0085736 A1    Mar. 29, 2018

Related U.S. Application Data

(62) Division of application No. 14/462,641, filed on Aug. 19, 2014, now Pat. No. 9,950,307.

(60) Provisional application No. 61/871,550, filed on Aug. 29, 2013.

(51) Int. Cl.
| | | |
|---|---|---|
| *C02F 1/28* | (2006.01) | |
| *B01D 15/36* | (2006.01) | |
| *B01J 20/06* | (2006.01) | |
| *B01J 20/26* | (2006.01) | |
| *B01J 20/32* | (2006.01) | |
| *B01J 45/00* | (2006.01) | |
| *C02F 101/20* | (2006.01) | |
| *C02F 103/10* | (2006.01) | |
| *C02F 103/36* | (2006.01) | |

(52) U.S. Cl.
CPC ............ *B01J 20/262* (2013.01); *B01D 15/36* (2013.01); *B01J 20/06* (2013.01); *B01J 20/3204* (2013.01); *B01J 20/3272* (2013.01); *B01J 45/00* (2013.01); *C02F 1/288* (2013.01); *C02F 2101/20* (2013.01); *C02F 2103/10* (2013.01); *C02F 2103/365* (2013.01)

(58) Field of Classification Search
None
See application file for complete search history.

(56) References Cited

U.S. PATENT DOCUMENTS

| 7,470,369 | B2 | 12/2008 | Diallo | |
|---|---|---|---|---|
| 2004/0224157 | A1* | 11/2004 | Campbell | ............... C07K 1/22 428/405 |
| 2007/0071713 | A1* | 3/2007 | Mahmud | .............. A61K 31/785 424/78.27 |
| 2009/0208580 | A1 | 8/2009 | Shi | |

OTHER PUBLICATIONS

Ahluwalia, S S., Goyal, D., 2006. Microbial and plant derived biomass for removal of heavy metals from wastewater, Bioresource Technology 98(12), 2243-57.
Astruc, D.; Boisselier, B.; Ornelas, C., 2010. Dendrimers Designed for Functions: From Physical, Photophysical, and Supramolecular Properties to Applications in Sensing, Catalysis, Molecular Electronics, Photonics, and Nanomedicine. Chemical Reviews 110, 1857-1959.
Barakat, M. A., 2011. New trends in removing heavy metals from industrial wastewater. Arabian Journal of Chemistry 4, 361-377.
Barakat, M. A.; Schmidt, E, 2010. Polymer-enhanced ultrafiltration process for heavy metals removal from industrial wastewater. Desalination 256, 90-93.
Barrera-Diaz, C.; Palomar-Pardavé, M.; Romero-Romo, M.; Ureña-Nuñez, F., 2005. Lead Removal from Wastewater Using Cu(II) Polymethacrylate Formed by Gamma Radiation. J. Polym. Res. 12, 421-428.
Belgin, B. J., 2002. Comparative study of adsorption properties of Turkish fly ashes: I. The case of nickel(II), copper(II) and zinc(II) J. Hazard. Mater. 95, 251-273.
Benhamou, A.; Baudu, M.; Derriche, Z.; Basly, J. P., 2009. Aqueous heavy metals removal on amine-functionalized Si-MCM-41 and Si-MCM-48. J. Hazard. Mater. 171, 1001-1008.
Cavuş , S.; Gürdag, G., 2008. Competitive heavy metal removal by poly(2-acrylamido-2-methyl-1-propane sulfonic acid-co-itaconic acid). Polymers for Advanced Technology 19, 1209-1217.
Copello, G. J.; Varela, F.; Vivot, R. M.; Diaz, L. E., 2008. Immobilized chitosan as biosorbent for the removal of Cd(II), Cr(III) and Cr(VI) from aqueous solutions. Bioresour. Technol. 99, 6538-6544.
Crini, G. 2005, Recent developments in polysaccharide-based materials used as adsorbents in wastewater treatment, Prog. Polym. Sci. 30, 38-70.
Denizli, A.; Garipcan, B.; Karabakan, A.; Senöz, H., 2005. Synthesis and characterization of poly(hydroxyethyl-methacrylate-N-methacryloyl-(I)-glutamic acid) copolymer beads for removal of lead ions. Materials Science & Engineering C 25, 448-454.
Deutsch, D. S.; Lafaye, G.; Liu, D.; Chandler, B. D.; Williams, C. T.; Amiridis, M. D., 2004. Decomposition and activation of Pt-dendrimer nanocomposites on a silica support. Catal. Lett. 97, 139-143.
Deutsch, D. S.; Siani, A.; Fanson, P. T.; Hirata, H.; Matsumoto, S.; Williams, C. T.; Amiridis, M. D., 2007. FT-IR Investigation of the Thermal Decomposition of Poly(amidoamine) Dendrimers and Dendrimer-Metal Nanocomposites Supported on Al2O3 and ZrO2. J. Phys. Chem. C 111, 4246-4255.

(Continued)

*Primary Examiner* — Ana L. Woodward
(74) *Attorney, Agent, or Firm* — Thomas|Horstemeyer, LLP

(57) ABSTRACT

Embodiments of the present disclosure provide for composites, methods of making composites, methods of removing a metal from a fluid, and the like.

12 Claims, 8 Drawing Sheets

(56) References Cited

OTHER PUBLICATIONS

Diallo, M. S.; Christie, S.; Swaminathan, P.; Balogh, L; Shi, X.; Um, W.; Papelis, C.; Goddard III, W. A.; Johnson Jr., J.-H., 2004. Dendritic Chelating Agents. 1. Cu(II) Binding to Ethylene Diamine Core Poly(amidoamine) Dendrimers in Aqueous Solutions. Langmuir 20, 2640-2651.

Diallo, M. S.; Christie, S.; Swaminathan, P.; Johnson Jr., J. H.; Goddard III, W. A., 2005. Dendrimer Enhanced Ultrafiltration. 1. Recovery of Cu(II) from Aqueous Solutions Using PAMAM Dendrimers with Ethylene Diamine Core and Terminal NH2 Groups. Environmental Science & Technology 39, 1366-1377.

Duran A.; Soylak, M.; Tuncel, S. A., 2008. Poly(vinyl pyridine-poly ethylene glycol methacrylate-ethylene glycol dimethaciylate) beads for heavy metal removal J. Hazard. Mater. 155, 114-120.

Ersöz A.; Say, R.-Denizli, A., 2004, Ni(II) ion-imprinted solid-phase extraction and preconcentration in aqueous—solutions by packed-bed columns, Analytica Chimica Acta 502, 91-97.

Guilherme, M. R.; Reis, A. V.; Paulino, A. T.; Fajardo, A. R; Muniz, E. C.; Tambourgi, E. B., 2007. Superabsorbent hydrogel based on modified polysaccharide for removal of Pb2+ and Cu2+ from water with excellent performance. Journal of Applied Polymer Science 105, 2903-2909.

Gupta, V.K. Rastogi, A. Saini, V.K. Jain, N. 2006, Biosorption of copper(II) from aqueous solutions by *Spirogyra* species, Journal of Colloid and Interface Science 296, 59-63.

Huang, W.; Kuhn, J. N.; Tsung, C.-K.; Zhang, Y.; Habas, S. E; Yang, P.; Somorjai, G. A., 2008. Dendrimer Templated Synthesis of One Nanometer Rh and Pt Particles Supported on Mesoporous Silica: Catalytic Activity for Ethylene and Pyrrole Hydrogenation. Nano Letters 8, 2027-2034.

Lemma, F.; Crillo, G.; Spizzirri, U. G.; Puoci, F.; Parisi, O. I.; Picci, N., 2008. Removal of metal ions from aqueous solution by chelating polymeric microspheres bearing phytic acid derivatives European Polymer Journal 44, 1183-1190.

Jang, S. H.; Jeong, G. Y.; Min, B. G.; Lyoo, W. S.; Lee, S. C., 2008. Preparation and lead ion removal property of hydroxyapatite/polyacrylamide composite hydrogels Journal of Hazardous Materials 159, 294-299.

Jensen, H.; Soloviev, A.; Li, Z.; Søgaard, E. G., 2005. XPS and FTIR investigation of the surface properties of different prepared titania nano-powders. Applied Surface Science 246, 239-249.

Kasgoz, H.; Ozgumus, S.; Orbay, M., 2003. Modified polyacrylamide hydrogels and their application in removal of heavy metal ions. Polymer 44, 1785-1793.

Kitchens, K. M.; Ghandehari, H., 2009. PAMAM Dendrimers as Nanoscale Oral Drug Delivery Systems. Nanotechnology in Drug Delivery. American Assoication of Pharmaceutical Scientists, New York, NY.

Kuhn, J. N.; Huang, W.; Tsung, C.-K.; Zhang, Y.; Somorjai, G. A., 2008. Structure Sensitivity of Carbon—Nitrogen Ring Opening: Impact of Platinum Particle Size from below 1 to 5 nm upon Pyrrole Hydrogenation Product Selectivity over Monodisperse Platinum Nanoparticles Loaded onto Mesoporous Silica Journal of American Chemical Society 130, 14026-14027.

Labieniec, M.; Watala, C., 2009. PAMAM dendrimers—diverse biomedical applications. Facts and unresolved questions. Central European Journal of Biology 4, 434-451.

Lard, M.; Kim, S. H.; Lin, S.; Bhattacharya, P.; Ke, R C.; Lamm, M. H., 2010. Fluorescence Resonance Energy Transfer between Phenanthrene and PAMAM Dendrimers. Phys. Chem. Chem. Phys. 12, 9285-9291.

Li, X G.; Ma, X. L.; Sun, J.; Huang, M. R. 2009. Powerful Reactive Sorption of Silver(I) and Mercury(II) onto Poly(o-phenylenediamine) Microparticles. Langmuir 25, 1675-1684.

Li, Y.; Liu, J. H.-C.; Witham, C. A.; Huang, W.; Marcus, M. A.; Fakra, S. C.; Alayoglu, P.; Zhu, Z.; Thompson, C. M.; Arun, K.; Lee, K.; Gross, E.; Toste, F. D.; Somorjai, G. A., 2011. A Pt-Cluster-Based Heterogeneous Catalyst for Homogeneous Catalytic Reactions: X-ray Absorption Spectroscopy and Reaction Kinetic Studies of Their Activity and Stability against Leaching. Journal of American Chemical Society 133, 13527-13533.

Liu, C.; Bai, R.; Ly, Q. S. 2008. Selective removal of copper and lead ions by diethylenetriamine-functionalized adsorbent: Behaviors and mechanisms. Water Research 42, 1511-1522.

Liu X.- Hu, Q.; Fang, Z.; Zhang, X.; Zhang, B., 2009. Magnetic Chitosan Nanocomposites: A Useful Recyclable Tool for Heavy Metal Ion Removal. Langmuir 25, 3-8.

Mankbadi, M. R.; Barakat, M. A.; Ramadan, M. H.; Woodcock, H. L.; Kuhn, J. N., 2011. Iron Chelation by Polyamidoamine Dendrimers: A Second-Order Kinetic Model for Metal Amine Complexation. Journal of Physical Chemistry B 115, 13534-13540.

Maroulis, M.; Economou, A.; Voulgaropoulos, A., 2007. Determination of Cd and Pb in Phosphorites and Phosphate Fertilizers by Means of a Portable Voltammetric Analyzer Based on "Virtual Instrumentation". Electroanalysis 19, 2149-2154.

Miretzky, P., Saralegui, A., Cirelli, A.F. 2006, Simultaneous heavy metal removal mechanism by dead macrophytes, Chemosphere 62, 247-254.

Mohan, D.; Pittman Jr., C. U., 2006. Activated carbons and low cost adsorbents for remediation of tri- and hexavalent chromium from water. Journal of Hazardous Materials 137 762-811.

Mostafa, K. M.; Samakandy, A. R.; El-Sanabary, A. A., 2009. Preparation of poly (MAA)-crosslinked pregelled starch graft copolymer and its application in waste water treatments. J. Appl. Polym. Sci. 112, 2838-2846.

Myers, V. S.; Weir, M. G.; Carino, E. V.; Yancey, D. F.; Pande, S.; Crooks, R. M., 2011. Dendrimer-encapsulated nanoparticles: New synthetic and characterization methods and catalytic applications. Chemical Science 2, 1632-1646.

Ozay, O.; Ekici, S.; Baran, Y.; Aktas, N.; Sahiner, N., 2009. Removal of toxic metal ions with magnetic hydrogels. Water Research 43, 4403-4411.

Petrov, S.; Nenov, V., 2004. Removal and recovery of copper from wastewater by a complexation-ultrafiltration process. Desalination 162, 201-209.

Petrucci, R. H.; Harwood, W. S.; Herring, G. E.; Madura, J., 2007. General Chemistry: Principles & Modern Applications. 9th ed. Upper Saddle River, New Jersey.

Rengaraj, S.; Kim, Y. K; Joo, C. K.; Yi, J., 2004. Removal of copper from aqueous solution by aminated and protonated mesoporous aluminas: kinetics and equilibrium J. Colloid Interface Sci. 273, 14-21.

Sankararamakrishnan, N.; Kumar, N.; Chauhan, V. S., 2008. Modeling fixed bed column for cadmium removal from electroplating wastewater. Sep. Purif. Technol. 63, 213-219.

Scott, R. W. J.; Wilson, O. M.; Crooks, R. M., 2005. Synthesis, Characterization, and Applications of Dendrimer-Encapsulated Nanoparticles. J. Phys. Chem. B, 109, 692-704.

Uğuzdoğan, E.; Denkbas, E. B.; Öztürk, E.; Tuncel, S. A.; Kabasakal, O. S., 2009. Preparation and characterization of polyethyleneglycolmethacrylate (PEGMA)-co-vinylimidazole (VI) microspheres to use in heavy metal removal J. Hazard. Mater. 162, 1073-1080.

Witham, C. A.; Huang, W.; Tsung, C.-K; Kuhn, J. N.; Somorjai, G. A.; Toste, F. D., 2010. Converting homogeneous to heterogeneous in electrophilic catalysis using monodisperse metal nanoparticles. Nature Chemistry 2, 36-41.

Xu, S.; Luo, R.; Wu, L.; Xu, K; Chen, G.-Q. 2006. Blending and characterizations of microbial poly(3-hydroxybutyrate) with denderimers. J. Applied Polymer Science. 102, 3782-3790.

Yamamoto, D.; Watanabe, S.; Miyahara, M. T., 2010. Coordination and Reduction Processes in the Synthesis of Dendrimer-Encapsulated Pt Nanoparticles. Langmuir 26, 2339-2345.

Yamamoto, D.; Watanabe, S.; Miyahara, M. T., 2011. Modeling Pt2+ Coordination Process within Poly(amidoamine) Dendrimers for Synthesis of Dendrimer-Encapsulated Pt Nanoparticles. Industrial Engineering Chemistry Research 50, 7332-7337.

Ye, H.; Scott, R. W. J.; Crooks, R. M., 2004. Synthesis, Characterization, and Surface Immobilization of Platinum and Palladium Nanoparticles Encapsulated within Amine-Terminated Poly(amidoamine) Dendrimers. Langmuir 20, 2915-2920.

(56) References Cited

OTHER PUBLICATIONS

Diallo, et al.; Dendritic Anion Hosts: Perchlorate Uptake by G5-NH2 Poly(propyleneimine) Dendrimer in Water and Model Electrolyte Solutions; Materials and Process Simulation Center, Beckman Institute 139-74, California Institute of Technology, Pasadena, California 91125, and Department of Civil Engineering, Howard University, Washington, DC, 20059; Environ. Sci. Technol., 2007, 41 (18), pp. 6521-6527; DOI: 10.1021/es0710959; Publication Date (Web): Aug. 11, 2007.

Birnbaum, et al; Selective Anion Binding from Water Using Soluble Polymers; Taylor & Francis Online; pp. 389-404 | Received Dec. 1, 2001, Published online: Feb. 15, 2007.

Zhou, et al; Membrane and Other Treatment Technologies— Pros and Cons; Springer Link; Perchlorate, pp. 389-404; Environmental and Chemical Sciences Divisions, Oak Ridge National Laboratory, Oak Ridge, TN 37831; Date unknown.

Diallo, et al; Dendrite Chelating Agents. 2. U(VI) Binding to Poly(amidoamine) and Poly(propyleneimine) Dendrimers in Aqueous Solutions; Materials and Process Simulation Center, Beckman Institute 139-74, California Institute of Technology, Pasadena, California 91125 and Department of Civil Engineering, Howard University, Washington, D.C. 20059; Environ. Sci. Technol., 2008, 42 (5), pp. 1572-1579; DOI: 10.1021/es0715905; Publication Date (Web): Jan. 23, 2008.

Selvam, P.; Bhatia, S. K.; Sonwane, C. G., 2001. Recent Advances in Processing and Characterization of Periodic Mesoporous MCM-41 Silicate Molecular Sieves. Ind. Eng. Chem. Res. 40, 3237-3261.

\* cited by examiner

Scheme 1

Scheme 2

METAL CHELATING COMPOSITES, METHODS OF USING COMPOSITES, AND METHODS OF MAKING COMPOSITES

CROSS-REFERENCE TO RELATED APPLICATION

This application is a divisional application of U.S. application Ser. No. 14/462,641, filed on Aug. 19, 2014, entitled "METAL CHELATING COMPOSITES, METHODS OF USING COMPOSITES, AND METHODS OF MAKING COMPOSITES" which claims priority to and the benefit of U.S. Provisional Application Ser. No. 61/871,550, filed on Aug. 29, 2013, entitled "METAL CHELATING COMPOSITES, METHODS OF USING COMPOSITES, AND METHODS OF MAKING COMPOSITES" which is incorporated herein by reference.

BACKGROUND

Metal-intoxication is a serious environmental and biological concern. Toxic metals are being increasingly deposited into water (surface, ground, and coastal), soil, and, inevitably, air and food. A major source of heavy metal introduction into the environment is attributed to industrial processes including automobile emissions, mining activities, battery manufacturing, fossil fuels, metal plating, and electronic industries. Not surprisingly this has resulted in significant biological and biomedical consequences. In fact, accumulation of iron, copper, and zinc in the body has been linked to neurodegenerative and psychological diseases such as Alzheimer's, Parkinson's, depression, memory loss, seizures, and dementia. Additionally, a life-saving treatment for sickle-cell disease and thalassemia, the two most common hemoglobinopathies, is blood transfusion, a therapy that has several detrimental side effects, including iron overload. Various removal methods such as membrane processes, neutralization-precipitation, extraction, and ion exchange are useful.

However, development of more economical alternatives remains a major goal. Consequently, strategies to efficiently and selectively chelate heavy metal ions are an active area of research.

SUMMARY

Embodiments of the present disclosure provide for composites, methods of making composites, methods of removing a metal from a fluid, and the like.

One exemplary embodiment of the composition, among others, includes: a support material having bonded to its surface a plurality of amine-rich macromolecules.

One exemplary embodiment of the composition, among others, includes: a support material having bonded to its surface a plurality of amine-rich macromolecules, wherein the support material is selected from the group consisting of: a metal oxide, a silica, a silicate, a carbon material, and a metal organic framework, wherein the amine-rich macromolecule is a polyamidoamine (PAMAM) dendrimer, a polypropylenimine (PPI) dendrimer, a polylysine dendrimer, and a phosphorous dendrimer, and wherein the amine-rich macromolecules are bonded to the surface of the support material through hydrogen bonds, electrostatic interactions, or a combination thereof.

One exemplary embodiment of the method of removing a metal from a fluid, among others, includes: exposing the fluid to a composite, wherein the composite is a support material having bonded to its surface a plurality of amine-rich macromolecules; chelating the metal to the composite to form a composite complex; and separating the composite complex from the fluid.

Other compositions, methods, features, and advantages of the present disclosure will be or become apparent to one with skill in the art upon examination of the following detailed description. It is intended that all such additional devices, systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
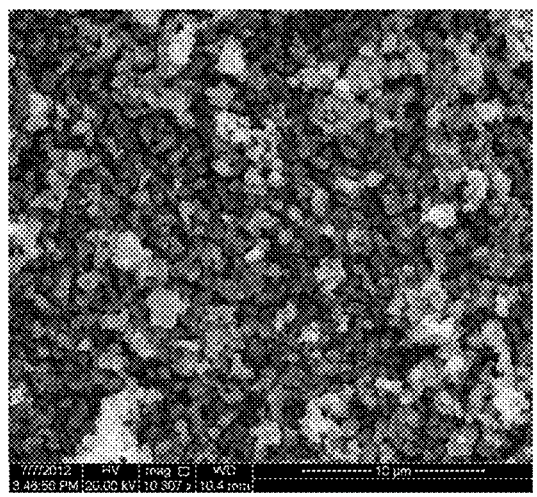
FIGS. 1A and 1B illustrate SEM images for the dendrimer/titania composite sample.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, synthetic organic chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in bar. Standard temperature and pressure are defined as 0° C. and 1 bar.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions:

The term "substituted" refers to any one or more hydrogens on the designated atom that can be replaced with a selection from the indicated group, provided that the designated atom's normal valence is not exceeded.

As used herein, "alkyl" or "alkyl group" refers to a branched saturated aliphatic hydrocarbon. Examples of alkyl include, but are not limited to, methyl, ethyl, vinyl, allyl, propyl, butyl, trifluoromethyl, pentafluoroethyl. In an embodiment, an alkyl group has 2 to 20 carbon atoms, 2 to 10 carbon atoms, 6 or less carbon atoms.

The term "substituted," as in "substituted alkyl", means that the substituted group may contain in place of one or more hydrogens a group such as alkyl, hydroxy, amino, halo, trifluoromethyl, cyano, —NH(alkyl), —N(alkyl)$_2$, alkoxy, alkylthio, or carboxy, and thus embraces the terms haloalkyl, alkoxy, fluorobenzyl, and the sulfur and phosphorous containing substitutions referred to below.

The "waste fluid" can refer to water from an industrial or municipal water treatment center, a mine, an oil processing or refining center, a coal processing center or plant, a smelting center, a disposal or incineration center, a non-ferrous metal processing center, a semiconductor fabrication center, mine water runoff (e.g., such as leachate from a tailings holding site, or mine dewatering), waste water stream from a coal-fired power plant, aqueous mixtures from one or more of any of the forgoing, and the like. In an embodiment, waste fluid can include wastewater, fats, oils or grease (FOG), used oil, and hazardous household liquids.

The "physiological fluid" may be, but is not limited to, urine, blood, ascites, pleural fluid, spinal fluid, and the like. In an embodiment, the sample can include numerous components (e.g., water, proteins, cells, sugars, lipids, fats, salts, enzymes, minerals, antibodies, hormones, and the like) and these components form the matrix as described herein.

General Discussion

Embodiments of the present disclosure provide for composites, methods of making composites, methods of removing a metal from a fluid, and the like. An embodiment, of the composite provides for a robust, selective, and recyclable chelation agent for application in the remediation of waste water and biological heavy metal toxicity.

In an embodiment, the composite can include an amine-rich macromolecule such as dendrimer (e.g., a polyamido-amine (PAMAM) dendrimer) bonded to a support material. In an embodiment, the amine-rich dendrimer can be used because of their high adsorption capacity. An embodiment of the dendrimer can absorb metal ions and have highly tunable properties, which will facilitate composite synthesis and regeneration. In an embodiment, the highly tunable properties can include non-existent toxicity, inexpensive, and readily available materials.

An amine-rich macromolecule can refer to a macromolecule that includes a plurality of amine groups. The amine-rich macromolecule can include dendrimers, lipids, proteins, and nucleic acids.

A dendrimer is a hyperbranched molecule having monomers that radiate from a central core. Dendrimers can be considered to have three major portions: a core, an inner shell, and an outer shell. Ideally, a dendrimer can be synthesized to have different functionality in each of these portions to control properties such as solubility, thermal stability, and attachment of compounds for particular applications. Synthetic processes can also precisely control the size and number of branches on the dendrimer. There are two defined methods of dendrimer synthesis, divergent synthesis and convergent synthesis. However, because the actual reactions include many steps needed to protect the active site, it is difficult to synthesize dendrimers using either method. This makes dendrimers hard to make and very expensive to purchase.

In an embodiment, the amine-rich macromolecule can include polyamidoamine (PAMAM) dendrimer, a polypropylenimine (PPI) dendrimer, a polylysine dendrimer, a phosphorous dendrimer, and the like, from generation 0 to generation 10 or higher. In particular, the amine-rich macromolecule can include a polyamidoamine (PAMAM) dendrimer, where the PAMAM dendrimer has an alkyl-diamine core and tertiary amine branches. In an embodiment, the alkyl in alkyl-diamine can include 2 to 20 carbon atoms or 2 to 10 carbon atoms. In particular, the alkyl-diamine can include ethylenediamine, 1,4-diaminobutane, 1,6-diaminohexane, 1,12-diaminododecane, as well as many others.

Dendrimers are classified by generation, which refers to the number of repeated branching cycles that are performed during its synthesis. For example if a dendrimer is made by convergent synthesis, and the branching reactions are performed onto the core molecule three times, the resulting dendrimer is considered a third generation dendrimer. Each successive generation results in a dendrimer roughly twice the molecular weight of the previous generation. Poly(amidoamine), or PAMAM, is perhaps the most well-known dendrimer. The core of PAMAM is a diamine (commonly ethylenediamine), which is reacted with methyl acrylate, and then another ethylenediamine to make the generation-0 (G-0) PAMAM. Successive reactions create higher generations, which tend to have different properties. Lower generations can be thought of as flexible molecules with no appreciable inner regions, while medium sized (G-3 or G-4) do have internal space that is essentially separated from the outer shell of the dendrimer. In an embodiment, the PAMAM dendrimer can be a first to seventh generation PAMAM dendrimer. In an embodiment, the PAMAM dendrimer can have a molecular weight of about 359 to 87227 (with number of terminal groups from 3 to 384) from G 0 to G 7, respectively. In an embodiment, the PAMAM dendrimer can be functionalized with functional moieties such as amine, imine, hydroxyl, succinamic acid, caboxylate, and the like.

In an embodiment, the amine-rich macromolecule can be bonded to the surface of the support material through hydrogen bonds and/or electrostatic interactions. In particular, the support material can have a negative charge and the amine-rich macromolecule can have a positive charge, so the there are strong electrostatic interactions between the support material and the amine-rich macromolecule. For example, the isoelectric point (point of zero charge) of titania is near 5, and the loading process is performed in a solution with a pH of about 7. At this pH, PAMAM dendrimers are positively charged, while the surface of titania is negatively charged. Therefore, strong electrostatic interactions exist between the dendrimer and titania. In the alternative or in addition to, the amine-rich macromolecule can be terminated with moieties that can form hydrogen bonds with groups on the surface of the support material. For example, PAMAM dendrimers can be terminated with hydroxyl groups, which could form multiple hydrogen bonds with hydroxyl groups on the surface of titania in water. In another embodiment, the amine-rich macromolecule can include functional moieties that can bond (e.g., covalent or ionic) to the surface groups of the support material.

In an embodiment, the support material can include a metal oxide, a silica, a silicate, a carbon material, or a metal organic framework. An embodiment of the metal oxide can include zirconia, titania, ceria, or zinc oxide. An embodiment of the carbon material can include graphite, carbon nanotubes, or graphene. An embodiment of the metal organic framework can include organic acids, metals, or N-containing organics.

In an embodiment, the support material can have chemical moieties (e.g., inherent to the support material or separately added to the surface as a film or the like) that can interact and/or react with the amine-rich macromolecule to become bound to the surface of the support material. In an embodiment, the support material can have hydroxyl groups, metal-oxygen bonds, organic functionalities, or a combination thereof.

In an embodiment, the support material can be spherical, semi-spherical, or non-spherical. In an embodiment, in a plurality of composites, the support material can have different shapes and dimensions. In an embodiment, the support material can have a longest dimension of about 10 nm to 100 microns (e.g., for a spherical or semi spherical support material, the longest dimension is the diameter). In an embodiment, the support material can include pores or the same or varying dimensions. In an embodiment, the support material can include 3 to 384 amine-rich macromolecules (from G 0 to G 7).

In an embodiment, the composite can be made by mixing the amine-rich macromolecule with a support material in an aqueous solution in a ratio of about 1:100 to 100:1(amine-rich macromolecule to support material). In an embodiment, the pH can be adjusted to about 4 to 14. In an embodiment, the mixture can be sonicated for about 0.5 to 5 hours. In an embodiment, the temperature can be about 1 to 100° C. After sonication, the mixture can be heated to remove the solvent. Subsequently, the composite can be dried (e.g., in an oven) to remove any residual moisture.

In an embodiment, the support material can be used to remove one or more metals from a fluid. In an embodiment, the fluid and the support material are introduced to one another. For example, the support material can be added to the fluid, where the fluid is flowing or the fluid is in a container. The fluid and the support material can be allowed to mix for an appropriate amount of time. The time can be based on one or more metals being below a certain threshold level or for a specific amount of time. In an embodiment, the metal is a metal ion. The metal ion chelates with the composite so that the metal ion is no longer part of the fluid.

After an appropriate amount of time, the fluid can be removed from the support material or the support material can be removed from the fluid. The separation of the fluid and the support material can be conducted in many ways, such as filtration, evaporation, chemical treatments, and centrifugation. In an embodiment, the fluid can be exposed to the support material multiple times to remove the metal, where a separation can occur between each step.

In an embodiment, the metal ion can include nickel, iron, cadmium, mercury, copper, tin, arsenic, selenium, chromium, platinum, palladium, rhodium, lead, or a combination thereof, and where appropriate, the metal ion can have two or more oxidation states. In an embodiment, multiple types of metal ions and/or different oxidation states of a metal ion can be removed.

In an embodiment, the fluid can be a waste fluid or a physiological fluid, such as those described herein. The amount of metal ion removed from a fluid can depend upon the composite, the amount of composite, the type or amount of metal ion, the fluid type, other components of the fluid, and the like.

In an embodiment, the fluid can be waste water, and the composite can be added to the waste water in batches or added to the waste water that is continuously flowing. After a period of time, the composite can be removed from the fluid. Subsequently, the metal can be removed from the composite and the composite can be reused.

In an embodiment, the fluid can be a physiological fluid, such as blood. The blood can be caused to come into contact with the composite and then returned to the body. In an embodiment, the blood can be caused to come into contact with the blood using a dialysis type system. After completion, the metal can be removed from the composite and the composite can be reused.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Brief Introduction:

Generation 4 polyamidoamine (PAMAM) dendrimers with ethylenediamine cores (G4-OH) were immobilized on titania ($TiO_2$) and examined as novel metal chelation materials. Characterization results indicate both the effective immobilization of dendrimers onto titania and retention of the dendrimer on titania following remediation. The effective remediation of Cu (II), Ni (II), and Cr (III), which are model pollutants commonly found in industrial electroplating wastewater, is demonstrated in this work. Parameters that influence the efficiency of metal ion removal were investigated; e.g., solution pH, retention time, metal ion concentration, and composite material dosage. Metal ion removal was achieved over a wide metal concentration range within a 1 hr equilibration time. Maximum metal ion removal was achieved at pH 7 for both Cu (II) and Cr (III), and pH 9 for Ni (II). Further, the dendrimer/titania composite materials were even more effective when metal ion mixtures were tested. Specifically, a dramatic increase was observed for Ni (II) chelation when in a mixture was compared to a pure nickel solution. These findings suggest new strategies for improving metal ion removal from industrial wastewater.

Introduction:

Dendrimers, hyperbranched molecules composed of monomers that radiate from a central core, are emerging as an important class of polymers. The structure of these materials has a great impact on their physical and chemical properties. As a result of their unique behavior, dendrimers are suitable for a wide range of applications including environmental remediation, nanoparticle synthesis, and nanomedicine {Scott, et al. (2005), Myers, et al. (2011), Astruc, et al. (2010)}. Perhaps the most studied are polyamidoamine (PAMAM) dendrimers, which are among the least toxic and are made from inexpensive, readily available materials {Kitchens and Ghandehari (2009), Lard, et al. (2010)}. In general, dendrimers have attracted attention because of their well-defined structures and chemical versatility. Specifically, the structure and chemical properties of dendrimers can be logically controlled by modification of the core, the type and number of repetitive branch units, and the terminal functional groups. Crowding of surface functional groups on higher-generation dendrimers leads to a close-packed spherical periphery surrounding interior cavities {Scott, et al. (2005)}. However, commercial applications of these materials have not yet been well explored.

Initial efforts in the application of PAMAM dendrimers focused on early generations {Scott, et al. (2005), Myers, et al. (2011), Astruc, et al. (2010)}, which have flat ellipsoidal shapes. However, higher generation dendrimers (4 and up) are starburst shaped and are particularly appealing for modern applications. PAMAM dendrimers' key property is their ability to chelate metal ions from solutions. This attribute has primarily been exploited in the synthesis of metal nanoparticles {Huang, et al. (2008), Kuhn, et al. (2008), Witham, et al. (2010), Li, et al. (2011)}, however recently dendrimer-based chelation has gained interest. For example, metal-intoxication is a serious environmental concern as they are both toxic and carcinogenic, even at relatively low concentrations {Jang et al. (2008), Liu, et al. (2008), lemma, et al. (2008), Liu, et al. (2009)}.

A major source of heavy metal introduction into the environment is attributed to industrial processes including automobile emissions, mining activities, battery manufacturing, fossil fuels {Guilherme, et al. (2007)}, metal plating, and electronic industries {Denizli, et al. (2005)}. Various removal methods such as membrane processes (dialysis, electrodialysis, reverse osmosis, etc.), neutralization-precipitation, extraction, and ion exchange are useful {Maroulis, et al. (2007), Barakat (2011)}. However, development of more economical alternatives remains a major goal, which is achieved in the present study through the synthesis of composite materials. Chelation is, therefore, well placed as a low cost and environmentally friendly technique that has the potential to overcome limitations seen other removal strategies {Rengaraj, et al. (2004), Barrera-Diaz, et al. (2005), Mohan and Pittman (2006), Sankaramakrishnan, et al. (2008), Benhamou, et al. (2009)}.

Polymers, activated carbon, metal oxides, silica, and ion exchange resins have been used in chelation process {Mohan and Pittman (2006), Duran, et al. (2008), Cavus and Gurdag (2008), Copello, et al. (2008), Uguzdogan, et al. (2009), Mostafa, et al. (2009), Li, et al. (2009)}. High surface area materials, including those just discussed, are appealing for separation applications {Selvam, et al. (2001)

}. Hydroxyl and amine-terminated PAMAM dendrimers are, perhaps, the most appropriate for metal complexation applications {Diallo, et al. (2004), Diallo, et al. (2005)}. PAMAM with OH terminal groups are both cost effective and non-toxic due to a lack of surface amines {Labieniec, et al. (2009)}. Encapsulation of metal ions by generation 4 hydroxyl-terminated PAMAM (G4-OH) involves coordinating each metal ion with one of the dendrimer's 62 tertiary amine sites {Yamamoto, et al. (2010)}. In the current study, PAMAM dendrimers with ethylenediamine cores (G4-OH) were immobilized on titania ($TiO_2$) and examined as novel metal chelation materials, i.e.: the novelty is mainly the incorporation of the dendrimer into titania. This concept was based on that hydroxyl and amine-terminated PAMAM dendrimers are, perhaps, the most popularly studied for metal complexation applications. PAMAM with OH terminal groups are especially nontoxic due to a lack of surface amines {Kitchens and Ghandehari (2009)}. PAMAM dendrimers were used to study the chelation and removal of Cu (II), Ni (II), and Cr (III) from synthetic solutions as models for wastewater produced by the electroplating industry. Titania was selected for the initial effort of making organic-inorganic hybrid materials for several reasons including its mechanical strength and its use already in wastewater treatment as photocatalysts for the decomposition of organics. The immobilization and retention of the dendrimer to the titania will be demonstrated. Critical parameters that influence metal ion removal including pH, batch retention time, metal ion concentration, and material dosage have been examined.

Materials and Methods

Materials

Generation 4 polyamidoamine (PAMAM) dendrimers (G4OH) were purchased from Sigma-Aldrich (through Dendritech®, Inc. in Midland, Mich.) as a 10% (mass) solution with methanol as the solvent and used without further purification. This dendrimer is 4.5 nm in diameter and has an ethylenediamine core (2-carbon core) with 64 external hydroxyl functional groups. Its overall formula is given by $C_{622}H_{1184}N_{186}O_{188}$, which results in a molecular weight of 14,277.19 g/mol.

Titanium (IV) dioxide or titania (rutile, 99.5% purity, 1 to 2 micron particle size) was purchased from Alfa-Aesar. Standard metal solutions of Cu (II), Ni (II), and Cr (III) with metal concentration of 1000 mg/L were used as metal precursors from nitrate salts. All other reagents were of analytical grade and supplied by Sigma-Alrich or Merck.

Synthesis and Characterization of $TiO_2$ Immobilized Dendrimers

The as-received G4-OH dendrimer-methanol solution (1 g) was diluted in a large excess of deionized water. Titania oxide was slowly added to the dendrimer containing aqueous solution to arrive at a slurry mixture. Once all of the titania was added, the dendrimer solution to titania ratio by mass was 1:99. After sonication (VWR ultrasonic cleaner, 135 W, 42 kHz) for 2 hours, the composite material was dried with heating on a hot plate (T=60° C.) to remove the solvent and then in a drying oven (T=90° C.) to remove all excess moisture.

The dendrimer/titania composites specimens were examined with a scanning electron microscope (SEM) Quanta FEG 450, FEI, Amsterdam, Netherland. The samples were placed on the double side carbon tape on Al-Stub and dried in air. The microscope was operated at an accelerating voltage of 20 kV. All samples were sputtered with a 20 nm thick gold layer (JEO. JFC-1600 Auto Fine Coater).

Infrared (FTIR) spectra were acquired with a PerkinElmer Spectrum 100 FTIR Spectrometer. Air was used for background subtraction. Nitrogen physisorption was performed on a Quantachrome Autosorb I. The specific surface area determined using the standard BET analysis of the adsorption isotherm. Samples were characterized using a Philips PANalytical X-Pert Pro X-ray diffractometer equipped with a Cu K alpha source. A preliminary thermogravimetric analysis (TGA) was done for the dendrimer/titania composite using a tube furnace. The temperature was raised to 300° C. for 2 hours with a heating rate of 10° C./minute according to the procedure done by Xu, et al. (2006).

Batch Remediation Experiments

Removal of heavy metal ions, Cu (II), Ni (II), and Cr (III), was carried out in 500 mL conical flask with magnetic stirrer by combining an appropriate amount of metal ions and the dendrimer/titania adsorbent. The pH of the aqueous solutions was monitored from 3 to 11 using an Orion pH meter (model 801A) and adjusted as needed with 1 M HCl or 1 M NaOH. Experiments were carried out for 120 minutes. Solutions were filtered after the experiments and metal ion concentrations were analyzed with an Inductive Coupled Plasma (ICP) instrument. The remediated amount was monitored as a function of time by removing 10 ml aliquot of solution for the ICP measurements. Efficiency of metal ion removal was calculated with the following equation:

$$\text{Efficiency of metal removal} = (C_0 - C)/C_0 \times 100 \quad (1)$$

where $C_0$ is the initial metal ion concentration and C is the retained metal ion concentration.

Results And Discussion

Synthesis and Characterization of Dendrimer/Titania Composites

Figure 1B:
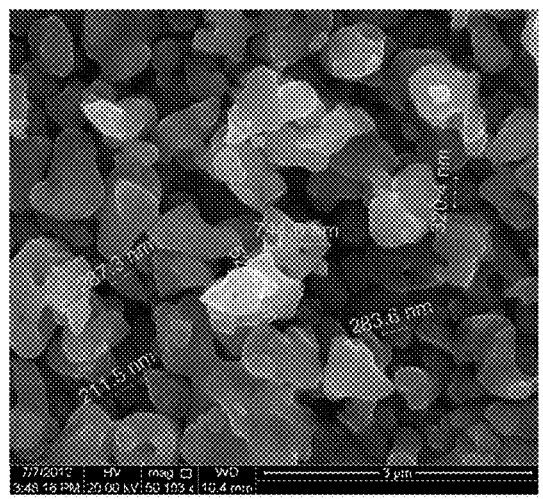

As shown in Scheme 1 (FIG. 14), G4-OH dendrimers were immobilized on titania in a slurry process. Dendrimers are hyperbranched polymeric macromolecules that radiate from a central core of which the size (generation) and functionality (internal and external functional groups) can be controlled. FIGS. 1A and 1B show SEM images for the structure of the dendrimer/titania composites. The Figure shows a porous surface with regions not covered by titania and a large aggregation of nanoparticles forming larger structures (FIG. 1B). The pore formation might be achieved via removal of the embedded dendrimer by taking advantage of the activated oxygen gas treatment. The titania framework was stable upon template removal, and the pores were replicated from the template dendrimer. Nanopores are not two-dimensional in that sense, since they are not connected with each other.

Figure 2A:
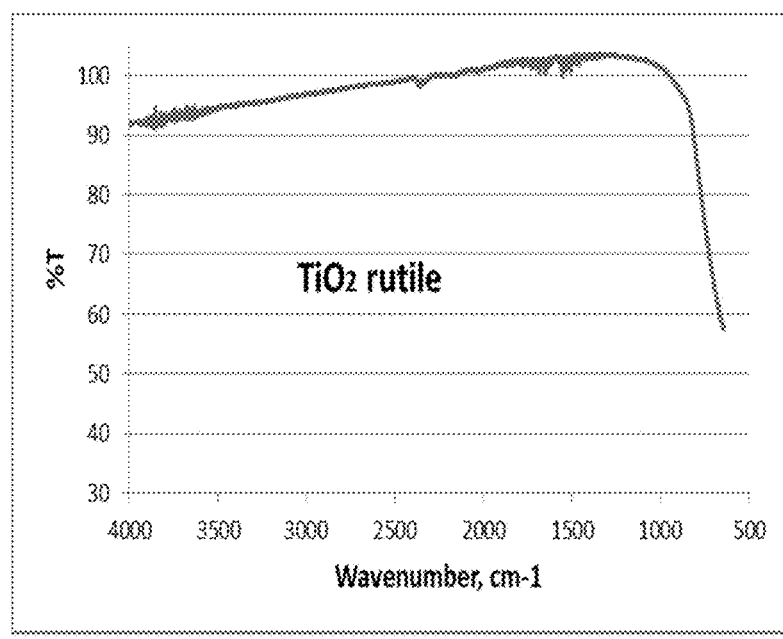
FIG. 2A illustrates FTIR spectra of pure titania (rutile) and FIG. 2B illustrates FTIR spectra of dendrimer/titania composite samples.
Figure 2B:
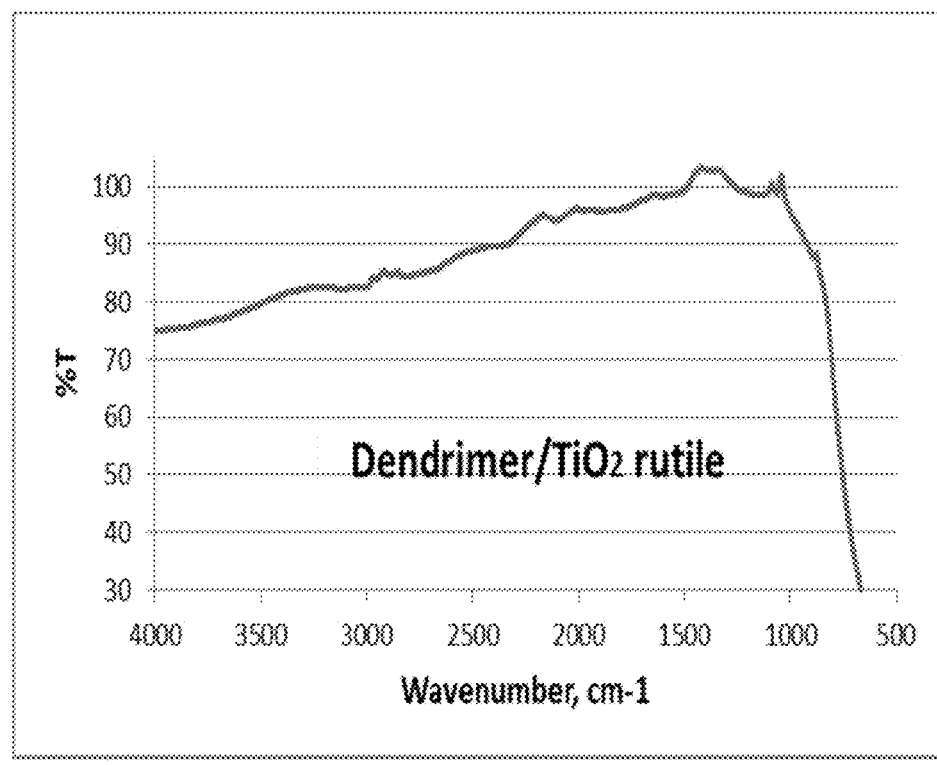

The mechanism of dendrimer loading onto titania in the freshly prepared composite is verified by FTIR as compared to pure titania rutile (FIGS. 2A and 2B). It is seen that there is no significant band with the pure titania in comparison with the dendrimer/titania composite. The bands associated to the various functionalities of the dendrimer were analyzed using identification existing in the literature {Deutsch, et al. (2004), Ye, et al. (2004), Deutsch, et al. (2007)}. The band at 2972 $cm^{-1}$ corresponds to C—H stretching. The bands at 1648, 1546, and 1279 $cm^{-1}$ indicate amide functionality through amide C=O stretching, amide C—N stretching and amide C—N—H bending/closing, and amide C—N—H bending/opening respectively. The bands at 1459, 1428, and 1349 $cm^{-1}$ associate, respectively, to H—C—H scissoring, H—C—H asymmetric deformation, and H—C—H rocking, wagging, and twisting. In addition to the vibrational signatures of the dendrimer, evidence of chemical linking of the organic dendrimer to the titania exists. The bands at 1092 and 1046 cm$^{-1}$ correspond to Ti—O—C bonds {Jensen, et al. (2005)}. The existence of these bands suggests a chemical interaction between the dendrimer and titania. Moreover, electrostatic interactions and hydrogen bonding may also be possible for dendrimer adsorption onto titania as follows; First, the isoelectric point (point of zero charge) of titania is near 5, and the loading process is performed in a solution with pH of 7. At this pH, PAMAM dendrimers are positively charged, while the surface of titania is negatively charged. Therefore, strong electrostatic interactions existed between the dendrimer and titania. Second, PAMAM dendrimers are terminated with 64 hydroxyl groups, which could form multiple hydrogen bonds with hydroxyl groups on the surface of titania in water.

The pore properties and specific surface areas of the titania was measured before and after dendrimer immobilization. As expected, the titania and the dendrimer/titania composite yielded similar results. The BET surface areas were 2.7 m$^2$/g. The pore diameters and volumes were 2.8 nm and 8×10$^{-3}$ cm$^3$/g, respectively. The structure of titania was also confirmed with a diffraction pattern of the rutile phase obtained. The (110), (101), (200), (111), (211), (220), and (310) Miller indices were observed. Thermogravimetric analysis was done to confirm the fixation and percentage of the dendrimer incorporated into titania, The calculated mass ratio of dendrimer to titania was 1%, however after TGA analysis, the real value of dendrimer was 0.86%. The dendrimer mass loss % was small (0.14%) and that confirming the good stability of the dendrimer onto titania.

Figure 14:
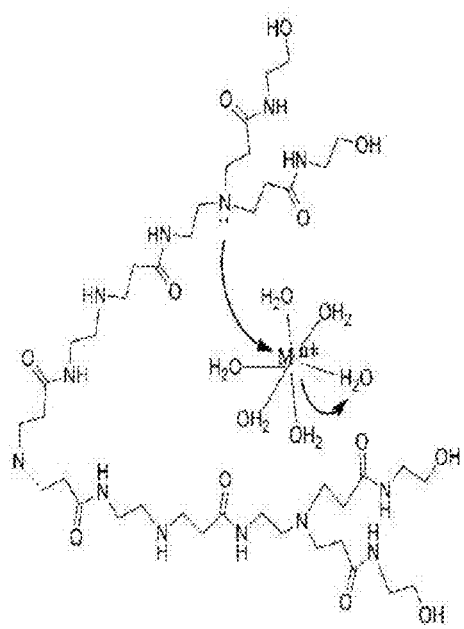
FIG. 14, Scheme 2, illustrates the conceptual mechanism of metal ions ($M^{n+}$) removal by dendrimer/Titania composite.

Efficiency of Dendrimer/Titania Composites for Metal Ion Removal From Wastewater Hydroxyl and amine-terminated PAMAM dendrimers are, perhaps, the most popularly studied for metal complexation applications. The mechanism of metal ions removal by the dendrimer/titania composites can be demonstrated as shown in Scheme 2 (FIG. 14). Encapsulation of metal ions by generation 4 hydroxyl-terminated PAMAM (G4-OH) involves coordinating each metal ion with one of the dendrimer's 62 tertiary amine sites. This phenomenon can be attributed to ligand-to-metal charge-transfer, i.e.; a transfer of electrons from the tertiary amine in dendrimer to the metal center, causing the compound to adopt its unique structure. The mechanism was studied in details in a previous work {Mankbadi, et al. (2011)}.

Figure 3:
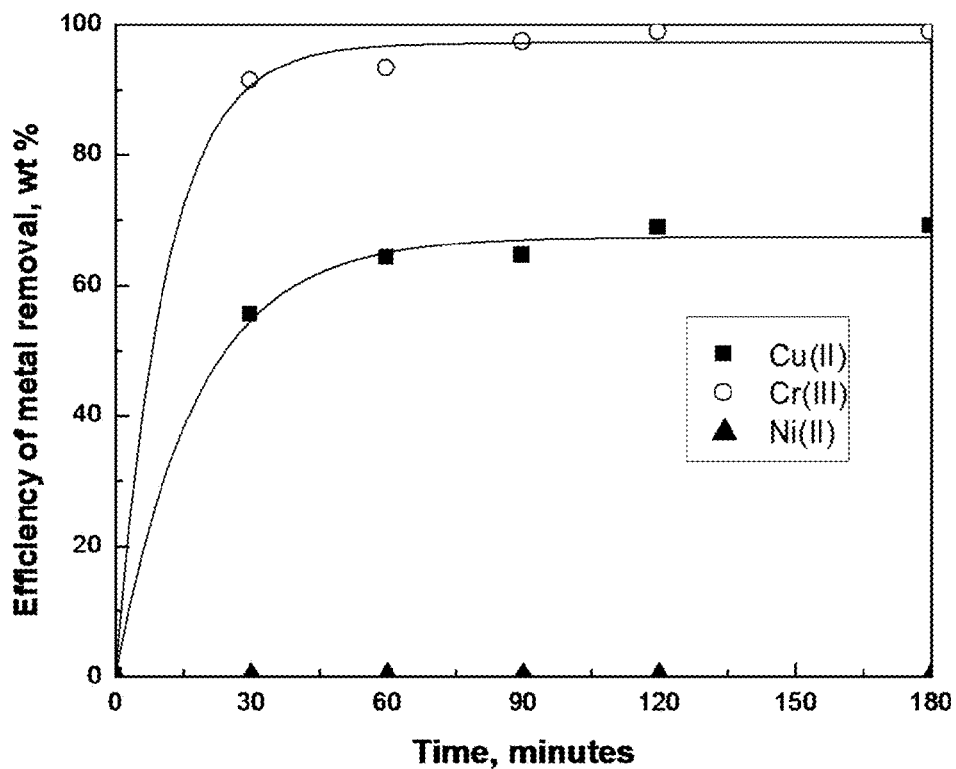
FIG. 3 illustrates the precipitation of Cu (II), Cr (III), or Ni (II) ions from aqueous solutions (independently) at pH 7. Conditions: Concentrations (for each metal ion)=50 mg/L and temperature=25° C., number of analysis repetitions=3.
Figure 4:
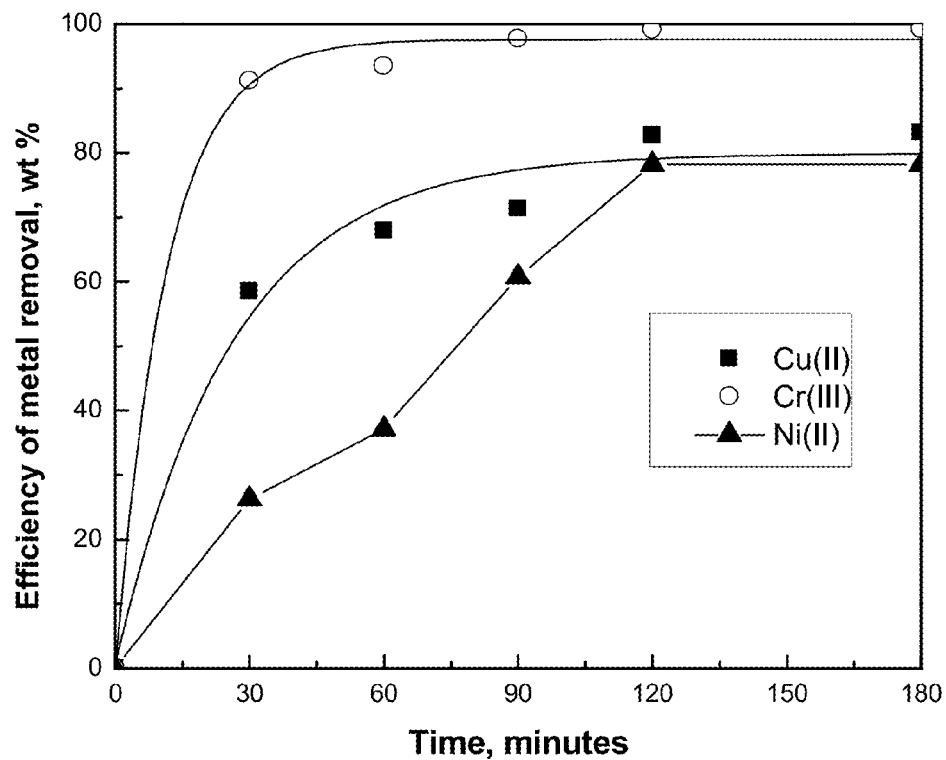
FIG. 4 illustrates the precipitation of Cu (II), Cr (III), or Ni (II) ions from aqueous solutions (independently) at pH 9. Conditions: Concentrations (for each metal ion)=50 mg/L and temperature=25° C., number of analysis repetitions=3.

The effect of pH on the removal of Cu (II), Cr (III), and Ni (II) ions (independently) from aqueous solution by precipitation (in absence of the dendrimers) at pH 7 and 9, respectively, is shown in FIGS. 3 and 4. Removal of Cr (III) ions by precipitation was very high as indicated by a removal efficiency of 99% after 90 minutes with both pH values of 7 and 9. In contrast, removal of Cu (II) ions by precipitation gradually increased with both increasing time and pH and reached a maximum removal efficiency of 64 and 78% at pH values of 7 and 9, respectively, after 3 hours. Removal of Ni (II) ions by precipitation occurred only at pH 9 (no precipitation was observed at pH 7). The precipitation gradually increased with increasing time reaching the maximum removal efficiency of 76% after 3 hours. The different precipitation behavior is attributed to the difference in the solubility product constants (Ks$_p$) of their hydroxide in solution in the order Cr (III)<Cu (II)<Ni (II). For example, the precipitation of Ni(OH)$_2$ is relatively difficult, compared to the other two metal hydroxides, due to its higher Ks$_p$ value {Petrucci, et al. (2007)} (Table 1).

TABLE 1

Solubility Product Constants (K$_{sp}$) at T = 25° C.

| Substance | Formula | K$_{sp}$ |
|---|---|---|
| Chromium(III) hydroxide | Cr(OH)$_3$ | 6.3 × 10$^{-31}$ |
| Copper(II) hydroxide | Cu(OH)$_2$ | 2.2 × 10$^{-20}$ |
| Nickel(II) hydroxide | Ni(OH)$_2$ | 2.0 × 10$^{-15}$ |

Figure 5:
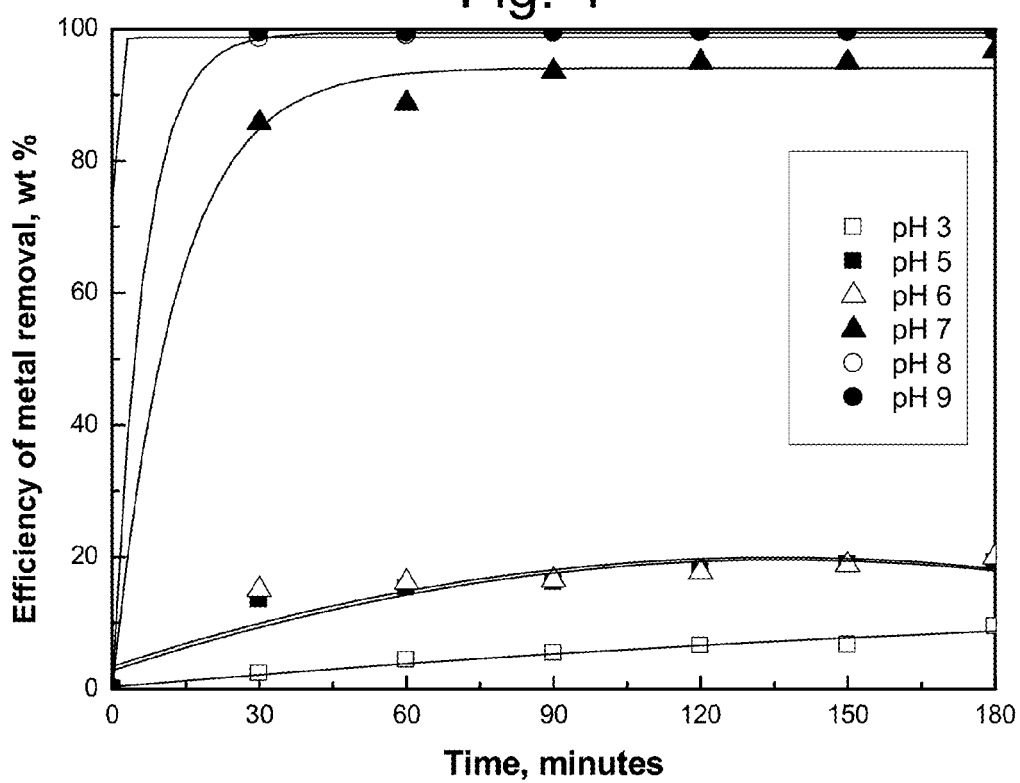
FIG. 5 illustrates the effect of pH on the Cu (II) ions removal from aqueous solution by dendrimer/titania composites. Conditions: Concentration of Cu (II) ions=50 mg/L, dendrimer dosage=1 g/L, and temperature=25° C., number of analysis repetitions=3.
Figure 6:
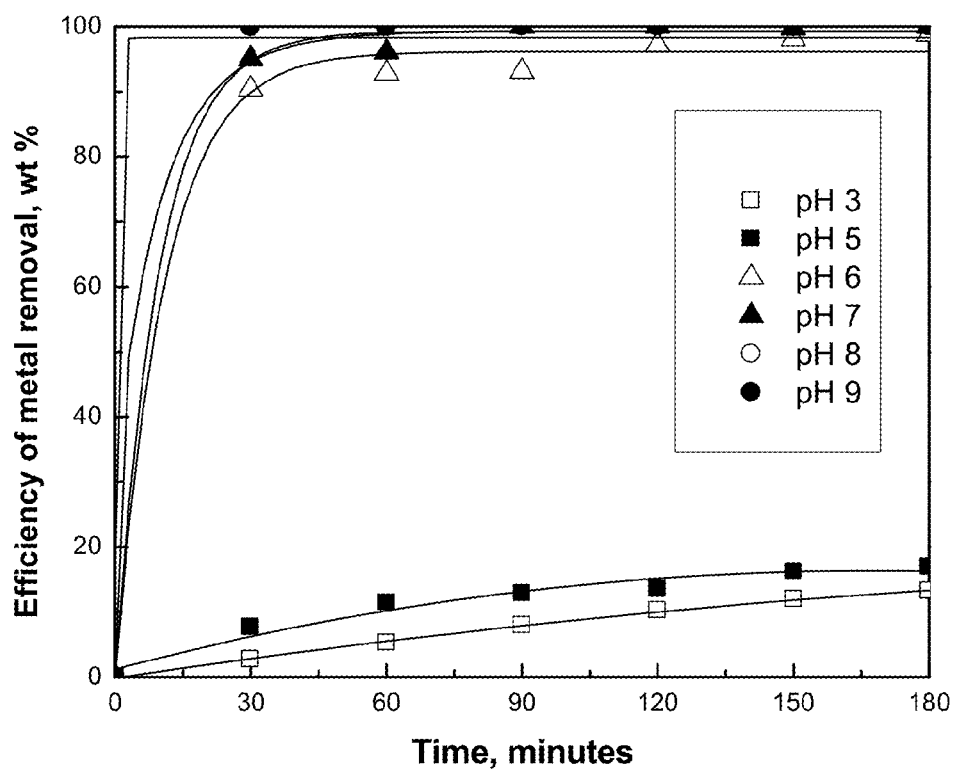
FIG. 6 illustrates the effect of pH on Cr (III) ions removal from aqueous solution by dendrimer/titania composites. Conditions: Concentration of Cr (III) ions=50 mg/L, dendrimer dosage=1 g/L, and temperature=25° C., number of analysis repetitions=3.
Figure 7:
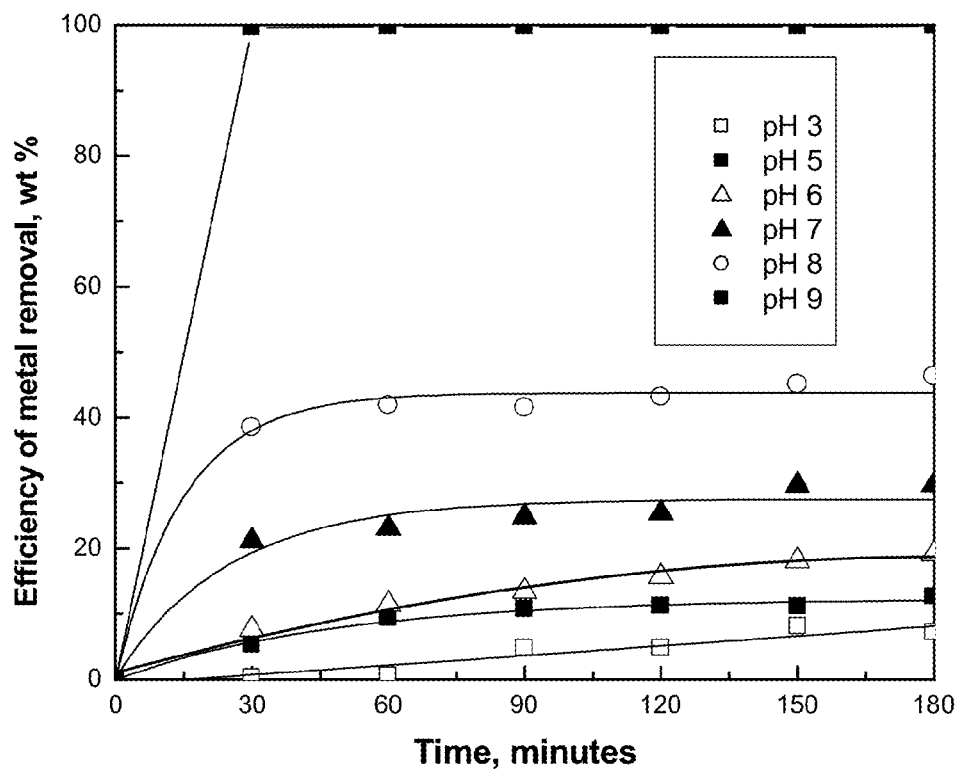
FIG. 7 illustrates the effect of pH on the Ni (II) ions removal from aqueous solution by dendrimer/titania composites. Conditions: Concentration of Ni (II) ions=50 mg/L, dendrimer dosage=1 g/L, and temperature=25° C., number of analysis repetitions=3.

Blank experiments were done with pure titania under the same conditions of the precipitation experiment. The results were similar to that of the precipitation experiments without any improvements. As with pure precipitation, the removal of metal ions with dendrimer/titania composites is highly dependent on the pH of the solution. This dependency results because pH can affect the surface charge of the adsorbent and the degree of ionization of the adsorbate {Belgin (2002)}. The effect of pH on the removal of Cu (II), Cr (III), and Ni (II) ions on dendrimer/titania composites is illustrated in FIGS. 5-7, respectively. Metal ion removal increased with increasing pH reaching maximum values after shorter time (1 hour) compared to precipitation. At pH 7, the removal efficiencies were 96.6, 99.9, and 29.7% for Cu (II), Cr (III), and Ni (II), respectively. Raising the pH to 9 resulted in a slight increase in Cu (II) removal to 99.6% and a drastic increase in Ni (II) removal to 99.8%. On comparing these results with that of precipitation (FIGS. 3 and 4), the dendrimer/titania composites had little effect on Cr (III) removal as it is already precipitated easily due to its low Ks$_p$ value. On the other hand, the dendrimer/titania composites improved the Cu (II) removal from 64% to 96.6% at pH 7, and from 78% to 99.6% at pH 9. A very significant increase in the removal efficiency of Ni (II) was achieved with the dendrimer/titania composites compared to precipitation (from zero to 29.7% at pH 7, and from 76 to 99.8% at pH 9 with shorter time). The dendrimers aid in removal because tertiary amines are able to efficiently complex metal ions from aqueous solutions {Yamamoto, et al. (2010), Yamamoto, et al. (2011), Mankbadi, et al. (2011)}.

Figure 8:
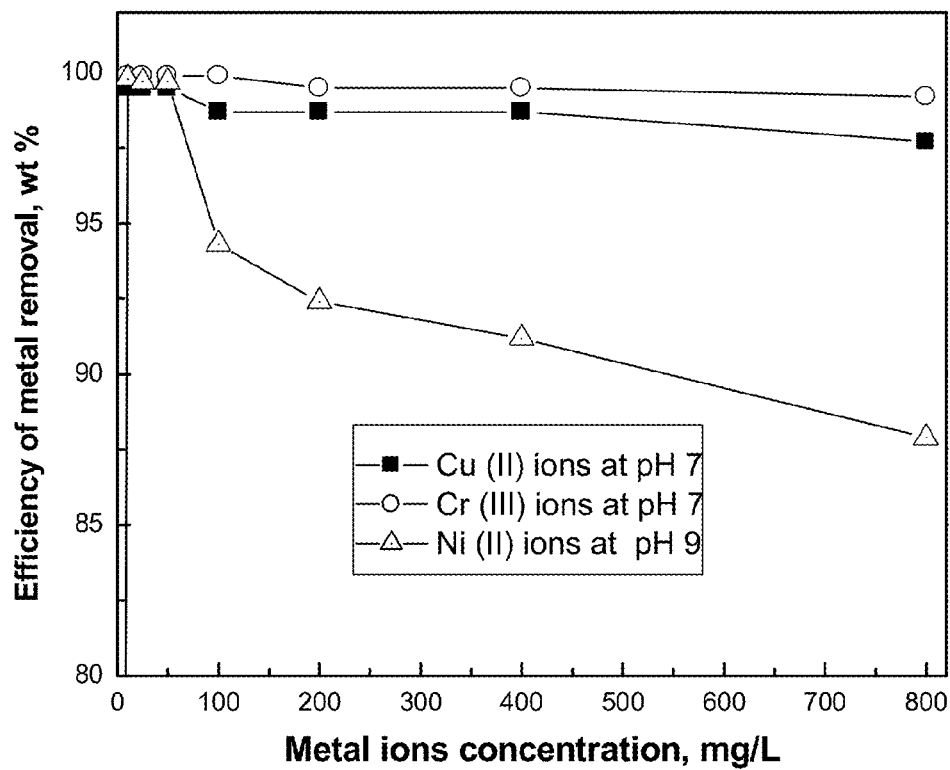
FIG. 8 illustrates the effect of metal ion concentration on their removal from solutions by dendrimer/titania composites. Conditions: Dendrimer dosage=1 g/L, time=1 h, and temperature=25° C., number of analysis repetitions=3.

The effect of metal ion concentration on their removal from solutions by dendrimer/titania composites is presented in FIG. 8. With low initial metal ion concentration (10 mg/L), almost complete removal was achieved for all three metals. Dendrimer/titania composites operated efficiently over a wide concentration range for both Cu (II) and Cr (III) ions. However, with Ni (II), the removal decreased gradually with an increase of Ni (II) ion concentration; removal efficiency was 87.9% with a Ni (II) concentration of 800 mg/L. This observation is due to the differential affinity of dendrimers towards certain metals. According to the Irving-Williams series, which ranks divalent metal ions by their tendency to complex regardless of the nature of the complexing agent, cations were ranked as follows: Cu (II)>Zn (II)>Pb (II)>Ni (II) {Petrov and Nenov (2004)}. Current results correlate with this proposed relationship as Cu (II) was easier to complex than Ni (II).

Figure 9:
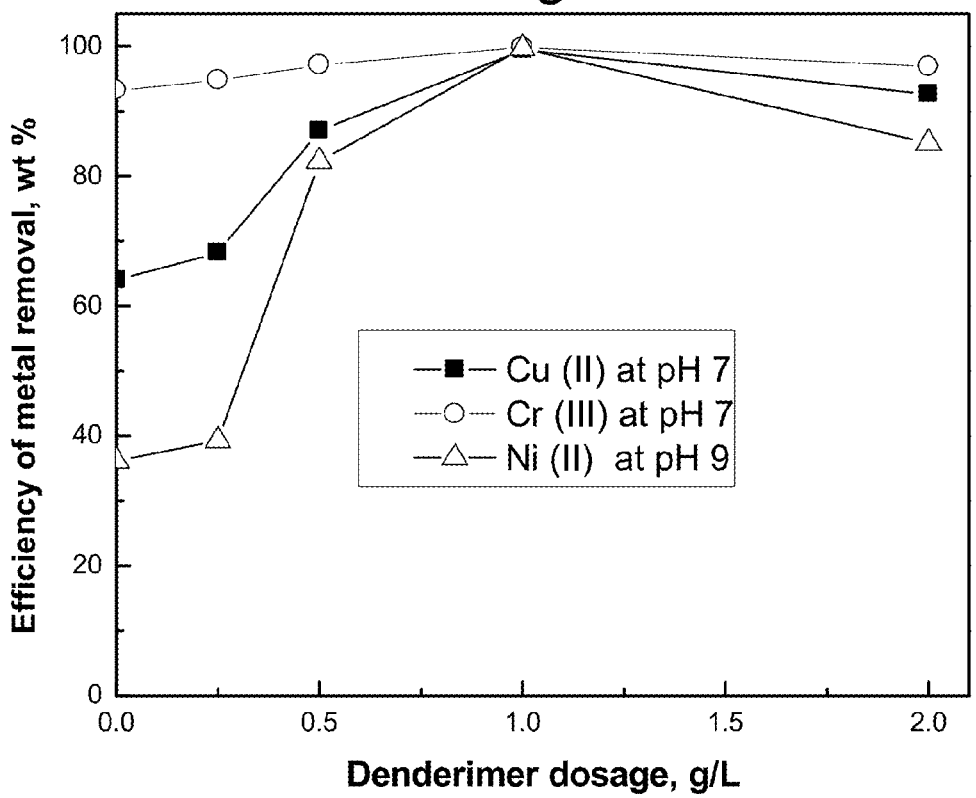
FIG. 9 illustrates the effect of dendrimer/titania composite dosage on the metals ion removal. Conditions: Concentration of metal ions=50 mg/L, time=1 h, and temperature=25° C., v.

The effect of dendrimer/titania dosage on metal ion removal is illustrated in FIG. 9. The effect of increased dosage on Cr (III) was negligible as precipitation is a strongly competing process, however, Cu (II) and Ni (II) ion removal efficiency increased with increasing dosage. This trend is expected due to an increase in the number of complexation sites. The removal efficiency reached maximum values of 99.6 and 99.2% for Cu (II) and Ni (II) ions, respectively, after 1 hour with a dosage of 1 g/L. However, the removal efficiency slightly decreased at dendrimer dosage>1 g/L. This is due to the aggregation of free dendrimer/titania particles that results in a decrease in the number of surface active sites.

Figure 10:
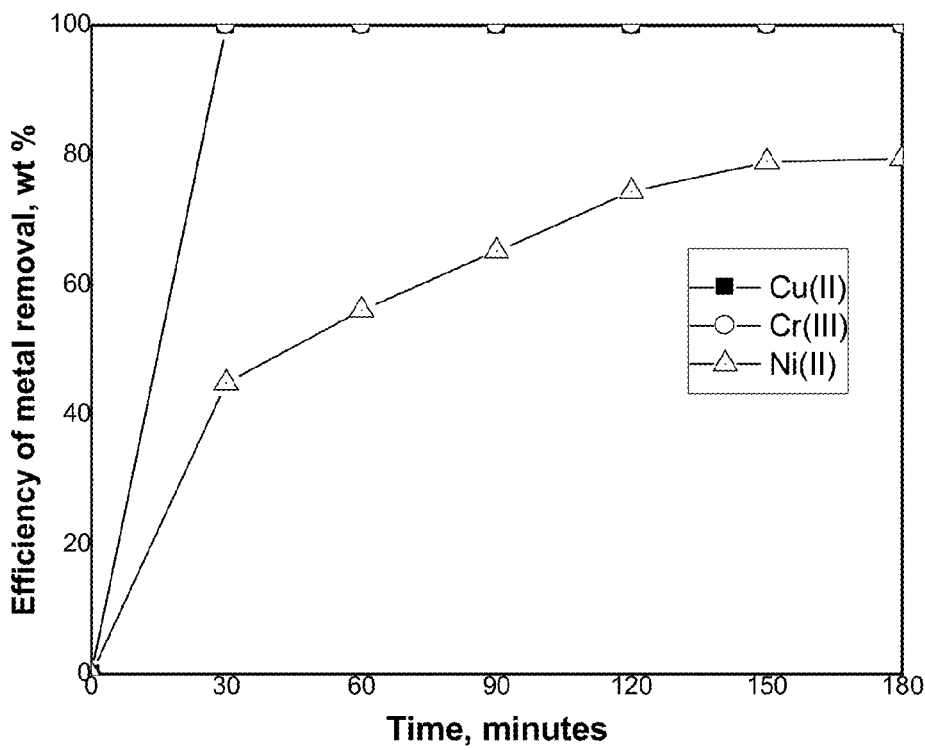
FIG. 10 illustrates the removal of Cu (II), Cr (III), and Ni (II) ions mixture simultaneously from aqueous solution by dendrimer/titania composites at pH=7. Conditions: Concentration of metal ions=50 mg/L, dendrimer dosage=1 g/L, and temperature=25° C., number of analysis repetitions=3.
Figure 11:
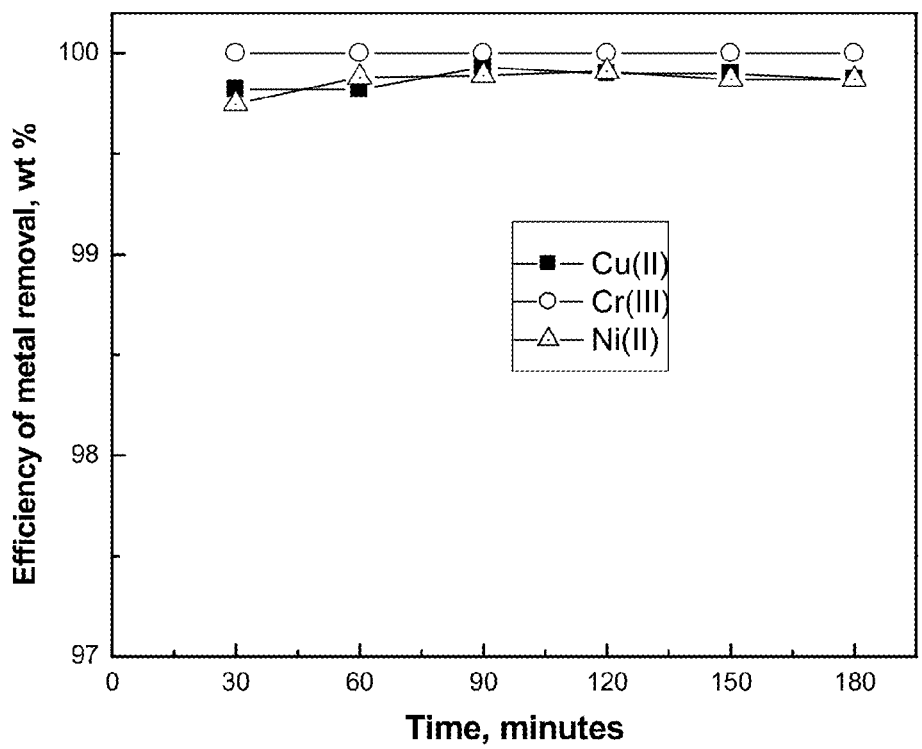
FIG. 11 illustrates the removal of Cu (II), Cr (III), and Ni (II) ions mixture simultaneously from aqueous solution by dendrimer/titania composites at pH=9. Conditions: Concentration of metal ions=50 mg/L, dendrimer dosage=1 g/L, and temperature=25° C., number of analysis repetitions=3.
Figure 12:
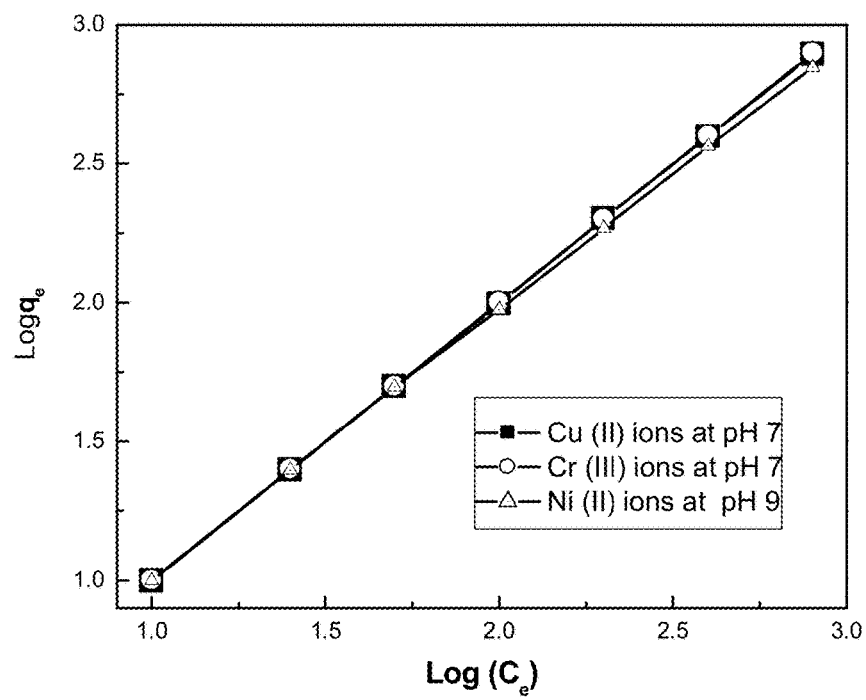
FIG. 12 illustrates a Freundlich isotherm for removal of Cu(II),Cr(III),Ni (II) ions from solutions by dendrimer/titania composites. Conditions: Dendrimer dosage=1 g/L, time=1 h, and temperature=25° C., number of analysis repetitions=3.
Figure 13:
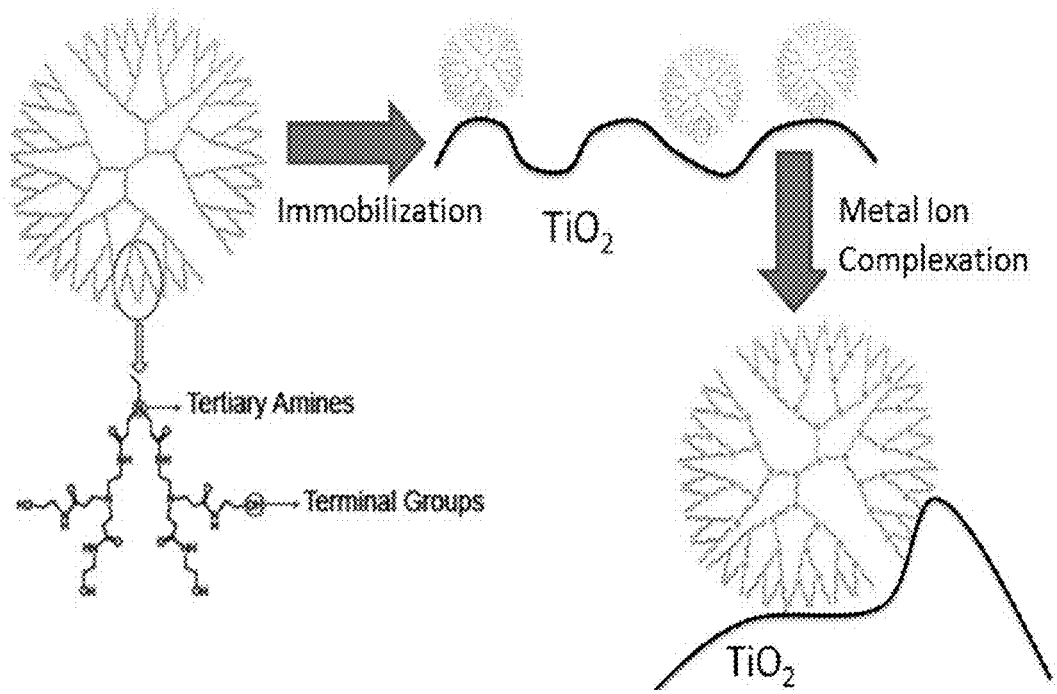
FIG. 13, Scheme 1, illustrates the synthesis strategy to immobilize G4-OH dendrimers on titania to achieve dendrimer/titania composites and their use for metal ion separations.

The simultaneous removal of Cu (II), Cr (III), and Ni (II) ions from solution by dendrimer/titania composites at pH 7 is shown in FIG. 10. The existence of the three metal ions in a mixture greatly enhanced the removal efficiency with shorter time particularly for Ni (II), which reached a removal efficiency of 56% after 1 hour (compared to 29.7% in the individual solution of Ni) and efficiency of 79.4% after 3 hours at pH 7. Complete removal of the three metals ions by the dendrimers, was achieved after 30 minutes at pH 7 for both for Cu (II) and Cr (III), and pH 9 for Ni (II) ions (FIG. 11). Enhancement of the removal efficiency for Ni (II) ions in the simultaneous solution may be attributed to the improvement of association and growth of the Ni complexes in the presence of Cu (II) and Cr (III) ions in a single solution {Barakat and Schmidt (2010)}. The adsorption isotherm can be used to describe how solutes interact with adsorbent. The Freundlich isotherm is one of the most common models to represent multi-site adsorption for heterogeneous surfaces. The Freundlich isotherm is represented as follows;

$$Q = k_F C_e^{bF} \qquad (2)$$

Where Q is the amount of metal ions adsorbed per gram of adsorbent (mg/g), $C_e$ is the metal ions concentration at equilibrium (mg/L), and $K_f$ is Freundlich constant. Freundlich isotherm for removal of Cu(II), Cr(III), Ni (II) ions from solutions by adsorption on the dendrimer/titania composites had been applied for this study (FIG. 12). The sorption of metal ions was carried out at different metal ions concentration ranging from 10 to 800 mg/L on 1 g/L dendrimers dosage, with the optimum time (1 hour) and pH value for each metal ion (pH 7 for Cu(II) and Cr(III) ions and pH 9 for Ni(II) ions). It can be seen that the Freundlich isotherm model fits well the experimental data, the linear plots indicates the high affinity of the dendrimers towards all the three metal ions. Thus, fitting of metals adsorption data to Freundlich isotherm can explain the efficient removal of simultaneous heavy metals, and this is coincident with other previous works {Miretzky, et al. (2006)}. Adsorption capacities of some adsorbents for the studied heavy metals are shown in Table 2.

TABLE 2

Adsorption capacities of some adsorbents for heavy metals

| Adsorbent | Adsorption capacity, mg/g | | | References |
| --- | --- | --- | --- | --- |
| | $Cu^2$ | $Cr^{3+}$ | $Ni^{2+}$ | |
| Imprinted polymer | | | 9.4 | Ersöz, et al. (2004) |
| Modified crosslinked polyacrylamides | 122 | | | Kasgoz, et al. (2003) |
| | 133 | | | Gupta, et al. (2006) |
| Spirogyra (green alga) | | 39.9 | | Ahluwalia, et al. (2006) |
| Bacillus- bacterial biomass | 164 | | | |
| Alumina/chitosan composite | 117.6 | 90.9 | 114.9 | Crini (2005) |
| Acrylamide hydrogel | | | | Ozay, et al. (2009) |

CONCLUSIONS

Remediation of Cu (II), Cr (III), and Ni (II) ions from synthetic wastewater solutions was successfully achieved using Generation 4 polyamidoamine dendrimers (G4-OH) immobilized on titania. Using these composite materials, the metal ion removal rate increased when compared to precipitation and occurred over a wide concentration range (up to 800 mg/L for each of the three metals) within an equilibration time of 1 hr. Whereas Cu (II) and Cr (III) were easily removed, Ni (II) proved difficult, which was expected due to its stability in a basic solutions. When solutions of multiple metal ions were mixed, an increase in removal efficiency and decrease in the time were observed. The Freundlich isotherm model fits well the experimental data for the simultaneous sorption of the three tested metals. This interesting synergistic effect suggests new strategies to improve wastewater processing. The mechanistic aspects of remediation and material regeneration are currently the focus of ongoing investigations.

REFERENCES

Ahluwalia, S S., Goyal, D., 2006. Microbial and plant derived biomass for removal of heavy metals from wastewater, Bioresource Technology 98(12), 2243-57.

Astruc, D.; Boisselier, B.; Ornelas, C., 2010. Dendrimers Designed for Functions: From Physical, Photophysical, and Supramolecular Properties to Applications in Sensing, Catalysis, Molecular Electronics, Photonics, and Nanomedicine. Chemical Reviews 110, 1857-1959.

Barakat, M. A., 2011. New trends in removing heavy metals from industrial wastewater. Arabian Journal of Chemistry 4, 361-377.

Barakat, M. A.; Schmidt, E., 2010. Polymer-enhanced ultrafiltration process for heavy metals removal from industrial wastewater. Desalination 256, 90-93.

Barrera-Diaz, C.; Palomar-Pardavé, M.; Romero-Romo, M.; Ureña-Nuñez, F., 2005. Lead Removal from Wastewater Using Cu(II) Polymethacrylate Formed by Gamma Radiation. J. Polym. Res. 12, 421-428.

Belgin, B. J., 2002. Comparative study of adsorption properties of Turkish fly ashes: I. The case of nickel(II), copper(II) and zinc(II) J. Hazard. Mater. 95, 251-273.

Benhamou, A.; Baudu, M.; Derriche, Z.; Basly, J. P., 2009. Aqueous heavy metals removal on amine-functionalized Si-MCM-41 and Si-MCM-48. J. Hazard. Mater. 171, 1001-1008.

Cavuş, S.; Gürdağ, G., 2008. Competitive heavy metal removal by poly(2-acrylamido-2-methyl-1-propane sulfonic acid-co-itaconic acid). Polymers for Advanced Technology 19, 1209-1217.

Copello, G. J.; Varela, F.; Vivot, R. M.; Diaz, L. E., 2008. Immobilized chitosan as biosorbent for the removal of Cd(II), Cr(III) and Cr(VI) from aqueous solutions. Bioresour. Technol. 99, 6538-6544.

Crini, G. 2005, Recent developments in polysaccharide-based materials used as adsorbents in wastewater treatment, Prog. Polym. Sci. 30, 38-70.

Denizli, A.; Garipcan, B.; Karabakan, A.; Senöz, H., 2005. Synthesis and characterization of poly(hydroxyethyl methacrylate-N-methacryloyl-(I)-glutamic acid) copolymer beads for removal of lead ions. Materials Science & Engineering C 25, 448-454.

Deutsch, D. S.; Lafaye, G.; Liu, D.; Chandler, B. D.; Williams, C. T.; Amiridis, M. D., 2004. Decomposition and activation of Pt-dendrimer nanocomposites on a silica support. Catal. Lett. 97, 139-143.

Deutsch, D. S.; Siani, A.; Fanson, P. T.; Hirata, H.; Matsumoto, S.; Williams, C. T.; Amiridis, M. D., 2007. FT-IR Investigation of the Thermal Decomposition of Poly (amidoamine) Dendrimers and Dendrimer-Metal Nanocomposites Supported on $Al_2O_3$ and $ZrO_2$. J. Phys. Chem. C 111, 4246-4255.

Diallo, M. S.; Christie, S.; Swaminathan, P.; Balogh, L.; Shi, X.; Um, W.; Papelis, C.; Goddard III, W. A.; Johnson Jr., J. H., 2004. Dendritic Chelating Agents. 1. Cu(II) Binding to Ethylene Diamine Core Poly(amidoamine) Dendrimers in Aqueous Solutions. Langmuir 20, 2640-2651.

Diallo, M. S.; Christie, S.; Swaminathan, P.; Johnson Jr., J. H.; Goddard III, W. A., 2005. Dendrimer Enhanced Ultrafiltration. 1. Recovery of Cu(II) from Aqueous Solutions Using PAMAM Dendrimers with Ethylene Diamine Core and Terminal $NH_2$ Groups. Environmental Science & Technology 39, 1366-1377.

Duran, A.; Soylak, M.; Tuncel, S. A., 2008. Poly(vinyl pyridine-poly ethylene glycol methacrylate-ethylene glycol dimethacrylate) beads for heavy metal removal J. Hazard. Mater. 155, 114-120.

Ersöz, A.; Say, R.; Denizli, A., 2004, Ni(II) ion-imprinted solid-phase extraction and preconcentration in aqueous solutions by packed-bed columns, Analytica Chimica Acta 502, 91-97.

Guilherme, M. R.; Reis, A. V.; Paulino, A. T.; Fajardo, A. R.; Muniz, E. C.; Tambourgi, E. B., 2007. Superabsorbent hydrogel based on modified polysaccharide for removal of Pb2+ and Cu2+ from water with excellent performance. Journal of Applied Polymer Science 105, 2903-2909.

Gupta, V. K. Rastogi, A. Saini, V. K. Jain, N. 2006, Biosorption of copper(II) from aqueous solutions by Spirogyra species, Journal of Colloid and Interface Science 296, 59-63.

Huang, W.; Kuhn, J. N.; Tsung, C.-K.; Zhang, Y.; Habas, S. E.; Yang, P.; Somorjai, G. A., 2008. Dendrimer Templated Synthesis of One Nanometer Rh and Pt Particles Supported on Mesoporous Silica: Catalytic Activity for Ethylene and Pyrrole Hydrogenation. Nano Letters 8, 2027-2034.

Iemma, F.; Crillo, G.; Spizzirri, U. G.; Puoci, F.; Parisi, O. I.; Picci, N., 2008. Removal of metal ions from aqueous solution by chelating polymeric microspheres bearing phytic acid derivatives European Polymer Journal 44, 1183-1190.

Jang, S. H.; Jeong, G. Y.; Min, B. G.; Lyoo, W. S.; Lee, S. C., 2008. Preparation and lead ion removal property of hydroxyapatite/polyacrylamide composite hydrogels Journal of Hazardous Materials 159, 294-299.

Jensen, H.; Soloviev, A.; Li, Z.; Søgaard, E. G., 2005. XPS and FTIR investigation of the surface properties of different prepared titania nano-powders. Applied Surface Science 246, 239-249.

Kasgoz, H.; Ozgumus S.; Orbay, M., 2003. Modified polyacrylamide hydrogels and their application in removal of heavy metal ions. Polymer 44, 1785-1793.

Kitchens, K. M.; Ghandehari, H., 2009. PAMAM Dendrimers as Nanoscale Oral Drug Delivery Systems. Nanotechnology in Drug Delivery. American Assoication of Pharmaceutical Scientists, New York, N.Y.

Kuhn, J. N.; Huang, W.; Tsung, C.-K.; Zhang, Y.; Somorjai, G. A., 2008. Structure Sensitivity of Carbon-Nitrogen Ring Opening: Impact of Platinum Particle Size from below 1 to 5 nm upon Pyrrole Hydrogenation Product Selectivity over Monodisperse Platinum Nanoparticles Loaded onto Mesoporous Silica Journal of American Chemical Society 130, 14026-14027.

Labieniec, M.; Watala, C., 2009. PAMAM dendrimers—diverse biomedical applications. Facts and unresolved questions. Central European Journal of Biology 4, 434-451.

Lard, M.; Kim, S. H.; Lin, S.; Bhattacharya, P.; Ke, P. C.; Lamm, M. H., 2010. Fluorescence Resonance Energy Transfer between Phenanthrene and PAMAM Dendrimers. Phys. Chem. Chem. Phys. 12, 9285-9291.

Li, X. G.; Ma, X. L.; Sun, J.; Huang, M. R., 2009. Powerful Reactive Sorption of Silver(I) and Mercury(II) onto Poly(o-phenylenediamine) Microparticles. Langmuir 25, 1675-1684.

Li, Y.; Liu, J. H.-C.; Witham, C. A.; Huang, W.; Marcus, M. A.; Fakra, S. C.; Alayoglu, P.; Zhu, Z.; Thompson, C. M.; Arjun, A.; Lee, K.; Gross, E.; Toste, F. D.; Somorjai, G. A., 2011. A Pt-Cluster-Based Heterogeneous Catalyst for Homogeneous Catalytic Reactions: X-ray Absorption Spectroscopy and Reaction Kinetic Studies of Their Activity and Stability against Leaching. Journal of American Chemical Society 133, 13527-13533.

Liu, C.; Bai, R.; Ly, Q. S., 2008. Selective removal of copper and lead ions by diethylenetriamine-functionalized adsorbent: Behaviors and mechanisms. Water Research 42, 1511-1522.

Liu, X.; Hu, Q.; Fang, Z.; Zhang, X.; Zhang, B., 2009. Magnetic Chitosan Nanocomposites: A Useful Recyclable Tool for Heavy Metal Ion Removal. Langmuir 25, 3-8.

Mankbadi, M. R.; Barakat, M. A.; Ramadan, M. H.; Woodcock, H. L.; Kuhn, J. N., 2011. Iron Chelation by Polyamidoamine Dendrimers: A Second-Order Kinetic Model for Metal Amine Complexation. Journal of Physical Chemistry B 115, 13534-13540.

Maroulis, M.; Economou, A.; Voulgaropoulos, A., 2007. Determination of Cd and Pb in Phosphorites and Phosphate Fertilizers by Means of a Portable Voltammetric Analyzer Based on "Virtual Instrumentation". Electroanalysis 19, 2149-2154.

Miretzky, P.; Saralegui, A.; Cirelli, A. F. 2006, Simultaneous heavy metal removal mechanism by dead macrophytes, Chemosphere 62, 247-254.

Mohan, D.; Pittman Jr., C. U., 2006. Activated carbons and low cost adsorbents for remediation of tri- and hexavalent chromium from water. Journal of Hazardous Materials 137 762-811.

Mostafa, K. M.; Samakandy, A. R.; El-Sanabary, A. A., 2009. Preparation of poly (MAA)-crosslinked pregelled starch graft copolymer and its application in waste water treatments. J. Appl. Polym. Sci. 112, 2838-2846.

Myers, V. S.; Weir, M. G.; Carino, E. V.; Yancey, D. F.; Pande, S.; Crooks, R. M., 2011. Dendrimer-encapsulated nanoparticles: New synthetic and characterization methods and catalytic applications. Chemical Science 2, 1632-1646.

Ozay, O.; Ekici, S.; Baran, Y.; Aktas, N.; Sahiner, N., 2009. Removal of toxic metal ions with magnetic hydrogels. Water Research 43, 4403-4411.

Petrov, S.; Nenov, V., 2004. Removal and recovery of copper from wastewater by a complexation-ultrafiltration process. Desalination 162, 201-209.

Petrucci, R. H.; Harwood, W. S.; Herring, G. E.; Madura, J., 2007. General Chemistry: Principles & Modern Applications. 9th ed. Upper Saddle River, N.J.

Rengaraj, S.; Kim, Y. K.; Joo, C. K.; Yi, J., 2004. Removal of copper from aqueous solution by aminated and protonated mesoporous aluminas: kinetics and equilibrium J. Colloid Interface Sci. 273, 14-21.

Sankararamakrishnan, N.; Kumar, N.; Chauhan, V. S., 2008. Modeling fixed bed column for cadmium removal from electroplating wastewater. Sep. Purif. Technol. 63, 213-219.

Scott, R. W. J.; Wilson, O. M.; Crooks, R. M., 2005. Synthesis, Characterization, and Applications of Dendrimer-Encapsulated Nanoparticles. J. Phys. Chem. B, 109, 692-704.

Selvam, P.; Bhatia, S. K.; Sonwane, C. G., 2001. Recent Advances in Processing and Characterization of Periodic Mesoporous MCM-41 Silicate Molecular Sieves. Ind. Eng. Chem. Res. 40, 3237-3261.Uğuzdoğan, E.; Denkbas, E. B.; Öztürk, E.; Tuncel, S. A.; Kabasakal, O. S., 2009. Preparation and characterization of polyethyleneglycolmethacrylate (PEGMA)-co-vinylimidazole (VI) microspheres to use in heavy metal removal J. Hazard. Mater. 162, 1073-1080.

Witham, C. A.; Huang, W.; Tsung, C.-K.; Kuhn, J. N.; Somorjai, G. A.; Toste, F. D., 2010. Converting homogeneous to heterogeneous in electrophilic catalysis using monodisperse metal nanoparticles. Nature Chemistry 2, 36-41.

Xu, S.; Luo, R.; Wu, L.; Xu, K.; Chen, G.-Q. 2006. Blending and characterizations of microbial poly(3-hydroxybutyrate) with dendrimers. J. Applied Polymer Science. 102, 3782-3790.

Yamamoto, D.; Watanabe, S.; Miyahara, M. T., 2010. Coordination and Reduction Processes in the Synthesis of Dendrimer-Encapsulated Pt Nanoparticles. Langmuir 26, 2339-2345.

Yamamoto, D.; Watanabe, S.; Miyahara, M. T., 2011. Modeling Pt2+ Coordination Process within Poly(amidoamine) Dendrimers for Synthesis of Dendrimer-Encapsulated Pt Nanoparticles. Industrial Engineering Chemistry Research 50, 7332-7337.

Ye, H.; Scott, R. W. J.; Crooks, R. M., 2004. Synthesis, Characterization, and Surface Immobilization of Platinum and Palladium Nanoparticles Encapsulated within Amine-Terminated Poly(amidoamine) Dendrimers. Langmuir 20, 2915-2920.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about y".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim at least the following:

1. A method of removing a metal from a fluid, comprising:
    exposing the fluid to a composite, wherein the composite is a support material having bonded to its surface a plurality of amine-rich macromolecules, wherein the amine-rich macromolecule is selected from the group consisting of: a polyamidoamine (PAMAM) dendrimer, and a polypropylenimine (PPI) dendrimer, and wherein the amine-rich macromolecules are bonded to the surface of the support material through hydrogen bonds, electrostatic interactions, or a combination thereof, wherein the support material is a metal oxide and the metal oxide is selected from the group consisting of: zirconia, titania, ceria, and zinc oxide;
    chelating the metal to the composite to form a composite complex; and
    separating the composite complex from the fluid.

2. The method of claim 1, wherein the amine-rich macromolecule is the polyamidoamine (PAMAM) dendrimer, wherein the PAMAM dendrimer has an alkyl-diamine core and tertiary amine branches, wherein the alkyl-diamine core is selected from the group consisting of: ethylenediamine, 1,4-diaminobutane, 1,6-diaminohexane, and 1, 12-diaminododecane.

3. The method of claim 1, wherein the amine-rich macromolecule is the polyamidoamine (PAMAM) dendrimer, wherein the PAMAM dendrimer is selected from the group consisting of: a first generation PAMAM dendrimer, a second generation PAMAM dendrimer, a third generation PAMAM dendrimer, a fourth generation PAMAM dendrimer, a fifth generation PAMAM dendrimer, a sixth generation PAMAM dendrimer, a seventh generation PAMAM dendrimer, and an eighth generation PAMAM dendrimer.

4. The method of claim 1, wherein the amine-rich macromolecule is the polyamidoamine (PAMAM) dendrimer, wherein the PAMAM dendrimer is functionalized with additional functional moieties selected from the group consisting of: an imine, a hydroxyl, a succinamic acid, and a combination thereof.

5. The method of claim 1, wherein the amine-rich macromolecule is a fourth generation polyamidoamine (PAMAM) dendrimer, wherein the PAMAM dendrimer has an ethylenediamine core and tertiary amine branches, and wherein the support material is titania.

6. The method of claim 1, wherein the amine-rich macromolecule is a fourth generation polyamidoamine (PAMAM) dendrimer.

7. The method of claim 1, wherein the amine-rich macromolecule is a PAMAM dendrimer having an ethylenediamine core and tertiary amine branches.

8. A method of removing a metal from a fluid, comprising:
    exposing the fluid to a composite, wherein the composite is a support material having bonded to its surface a plurality of amine-rich macromolecules, wherein the amine-rich macromolecules are bonded to the surface of the support material through hydrogen bonds, electrostatic interactions, or a combination thereof, wherein the amine-rich macromolecule is a fourth generation polyamidoamine (PAMAM) dendrimer, wherein the PAMAM dendrimer has an ethylenediamine core and tertiary amine branches, and wherein the support material is titania;
    chelating the metal to the composite to form a composite complex; and
    separating the composite complex from the fluid.

9. The method of claim 8, wherein the metal is a metal ion.

10. The method of claim 9, wherein the metal ion is selected from the group consisting of: nickel ion, iron ion, cadmium ion, mercury ion, copper ion, tin ion, arsenic ion, selenium ion, chromium ion, platinum ion, palladium ion, rhodium ion, and lead ion.

11. The method of claim 8, wherein the fluid is a waste fluid.

12. The method of claim 8, wherein the fluid is a physiological fluid.

\* \* \* \* \*